Figure 1:
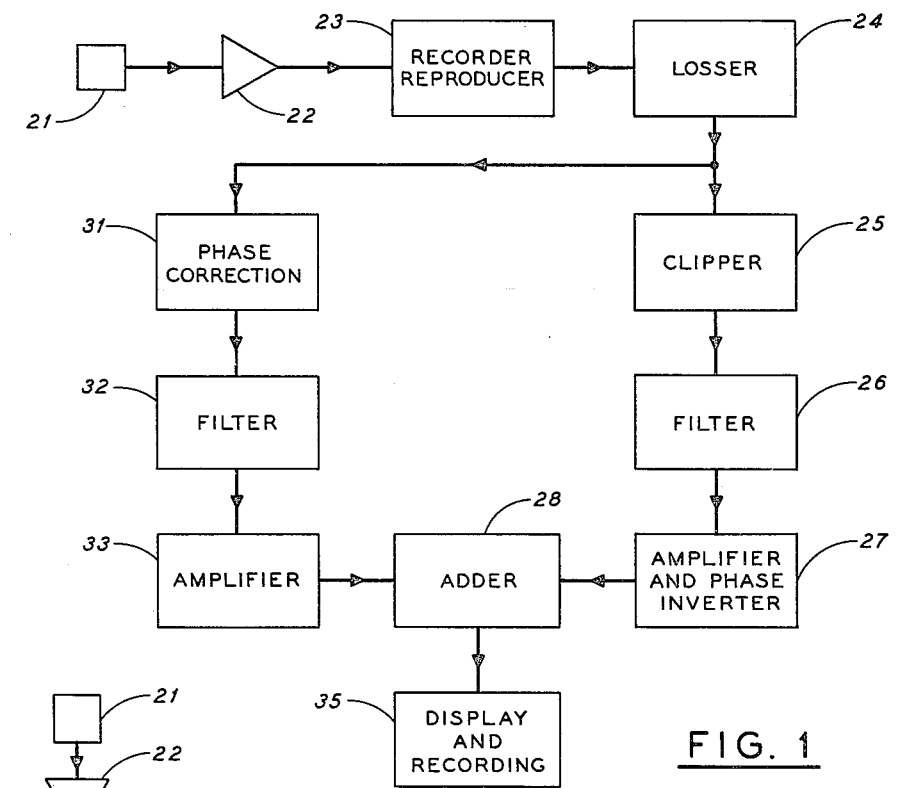

INVENTOR
WAYNE W. GRANNEMANN

United States Patent Office 2,987,701
Patented June 6, 1961

---

2,987,701
METHODS AND APPARATUS FOR ELIMINATING SINGING COMPONENTS FROM SEISMIC SIGNALS
Wayne W. Grannemann, La Habra, Calif., assignor to California Research Corporation, San Francisco, Calif., a corporation of Delaware
Filed May 31, 1955, Ser. No. 511,887
4 Claims. (Cl. 340—15)

This invention relates, in general, to seismic prospecting and relates more specifically to methods and apparatus for analyzing the data obtained in such prospecting to extract the maximum amount of information therefrom.

In the art of seismic prospecting, seismic waves artificially generated in the earth are utilized to actuate a plurality of seismic wave detectors which are responsive to reflections and refractions of the waves from subsurface strata to produce electrical output traces varying in sympathy with the received waves. Ideally, such traces, when plotted as a function of time, contain peaks or signal portions indicating receipt of energy reflected from subsurface interfaces, and have a minimum amplitude between such signal portions. However, in practice, a great deal of extraneous energy is received by the detectors simultaneously with the desired reflected energy of interest, thus rendering recognitions of the reflected energy difficult or impossible.

One of the troublesome forms of extraneous energy is that encountered in marine seismic prospecting in which the layer of water in which the detectors are located is believed to act as a form of wave guide for seismic energy. Aside from wave propagation, there are believed to be other normal vibrational mode effects. Some of these effects are believed to dominate in shallow water, and others to dominate in deep water. At the present time, however, the effects are incompletely understood, and seismologists are not all agreed as to the relative importance of the various effects, or even as to the existence of some of them. Regardless of the cause, it is well known that certain marine seismic records contain dominant frequency components which are so obvious because of their intensity and duration throughout the record that they have caused the records themselves to be designated by the term "singing records." The dominant frequency component is sometimes almost perfectly sinusoidal in wave form, and the records appear so uniform along their length that reflections are almost impossible to detect. Usually the remarkable, almost purely sinusoidal, character of these records does not become fully evident until the seismic signals have been passed through a filter having a pass band that pans the inherent dominant frequency. It so happens that the dominant frequencies in question often occur in the pass bands of conventionally used seismic filters. This singing phenomena is made more apparent where automatic gain control is used to maintain the amplitude of the recorded seismic detector traces within predetermined limits, since such gain control has the effect of tending to equalize the amplitudes of successive portions of the "singing" component, even though the actual amplitudes thereof normally decrease as a funtion of time after the seismic disturbance. Thus, a representative singing record might comprise a nearly sinusoidal wave train extending over a considerable period of time, with reflections superposed thereon in the form of obscure and almost indetectable amplitude or phase variations of the "singing" component.

In addition to having a predominant component, the singing records also often exhibit a beat effect, in which the average amplitude of the detector trace oscillates about a mean value, the frequency of this beat usually being some submutiple of the frequency of the singing component.

Heretofore numerous methods have been proposed for eliminating this singing component from seismic records, but none of such proposals have met with any substantial success. One of the approaches used in an attempt to solve this problem is to pass the detector trace through a "notch" filter having a very narrow pass band which, ideally, coincides with the frequency of the "singing" component. Such a method is effective where the frequency of the "singing" component is known and remains substantially constant throughout the duration of the recordable limits of the disturbance, but this method is unsatisfactory where the frequency of the "singing" component varies during the disturbance, as is usually the case in practice.

Broadly, the present invention contemplates methods and apparatus for analyzing seismic detector traces to remove an undesired component therein in which an auxiliary trace is produced which has a frequency and amplitude substantially identical to that of the undesired component of the seismic detector trace and this auxiliary trace is subtracted from the seismic detector trace to effectively cancel out the undesired component. More particularly, in the present invention, the seismic detector trace is passed through a network which produces an auxiliary trace having a frequency determined by the frequency of the seismic detector trace itself. This auxiliary trace is then passed through a filter which eliminates harmonics to produce a substantially sinusoidal wave having a frequency determined by the frequency of the seismic detector trace. This substantially sinusoidal component is then either inverted in phase and added to the seismic detector trace itself, or, alternatively, subtracted directly from the seismic detector trace, to cancel the undesired component from the seismic detector trace. It will be apparent that the amplitude of the auxiliary signal should correspond to the amplitude of the singing component to produce effective cancellation of the singing component. The resultant trace is then recorded in some manner, either alone, or, preferably, in conjunction with the original seismic detector trace to facilitate correlation of the traces.

In an alternate form of the invention, the seismic detector trace may first be differentiated to increase the amplitude of the signal portions of the trace. Differentiation is particularly effective in increasing the amplitude of signal portions which appear as phase variations in the original detector trace, since the differentiation converts these phase variations into amplitude variations. The differentiated trace is then supplied to a network to produce an auxiliary trace having substantially the same amplitude and frequency as the differentiated trace, and this auxiliary trace is subtracted from the differentiated trace to produce effective cancellation of the undesired singing component.

It is, therefore, an object of the present invention to provide improved methods and apparatus for anlayzing seismic detector traces to eliminate a predetermined component thereof.

It is a further object of this invention to provide methods and apparatus for analyzing seismic detector traces having a predominant frequency component superposed on the signal portions of the trace in which an auxiliary trace is generated having a frequency and amplitude corresponding to the frequency and amplitude of the undesired component in the detector trace and this auxiliary trace is subtracted from the seismic detector trace to effectively cancel the predetermined frequency component therefrom.

It is an additional object of the present invention to provide methods and apparatus for analyzing seismic detector traces having a predetermined component superposed on the signal portions of the trace, in which the detector trace is first differentiated to convert phase changes in the detector trace to amplitude changes in the differentiated trace, and this differentiated trace is then passed through a network to produce an auxiliary trace having a frequency and amplitude corresponding to the major frequency component of the differentiated trace so that subtraction of the auxiliary trace from the differentiated trace effectively cancels the major frequency component.

Figure 2:
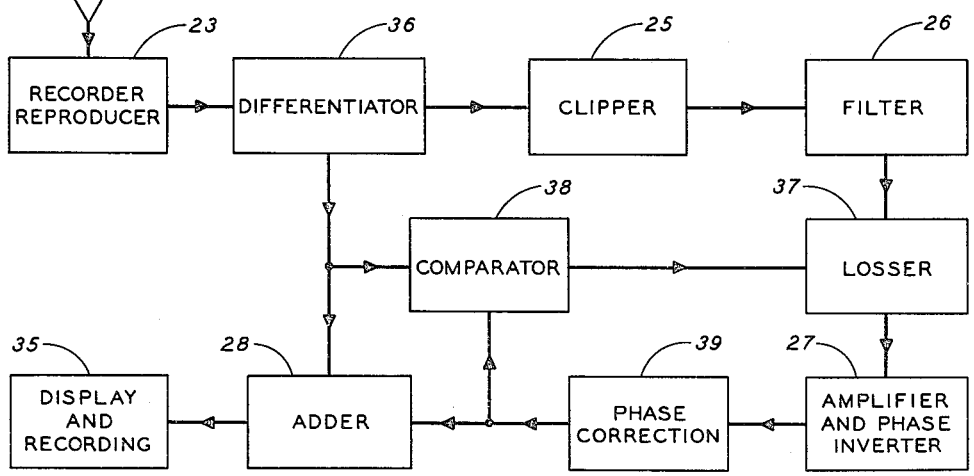
Figure 3:
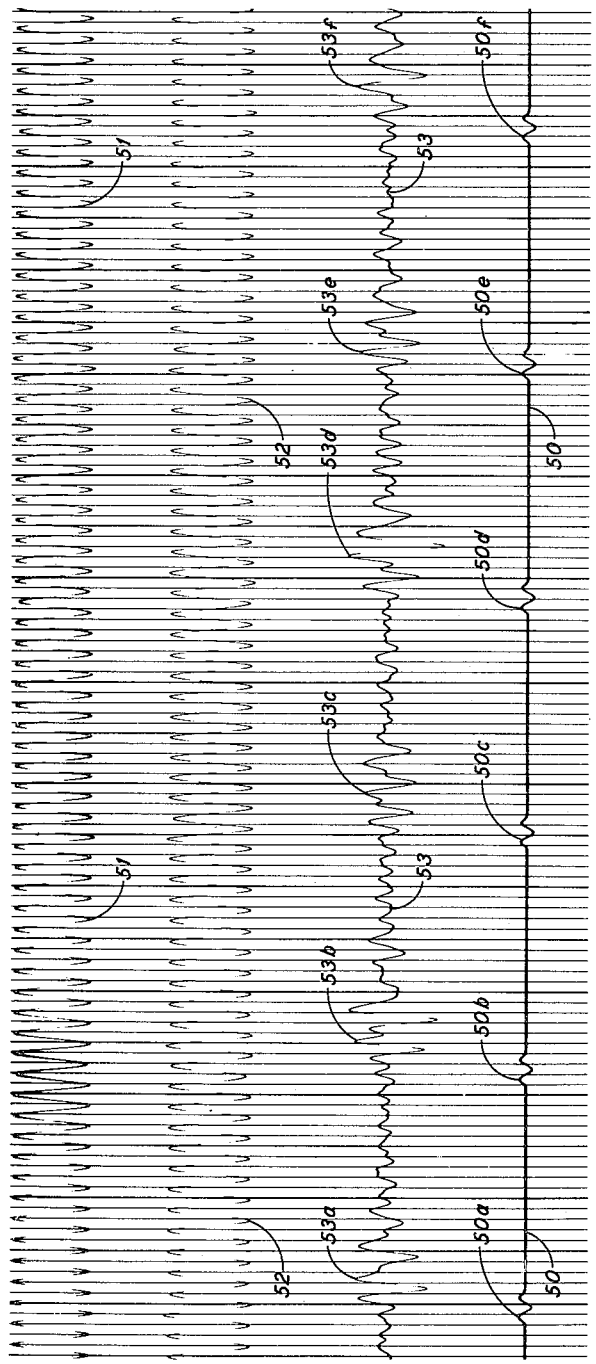

Objects and advantages other than those set forth above will be readily apparent from the following description when read in connection with the accompanying drawing, in which:

FIG. 1 diagrammatically illustrates one embodiment of the present invention,

FIG. 2 diagrammatically illustrates an alternate embodiment of the present invention in which the detector trace is differentiated prior to generation of the auxiliary signal, and FIG. 3 is a photo-reproduction of an oscillographic record of the results of tests of the present invention on simulated singing records.

Referring to FIG. 1 by character of reference numeral 21 designates a seismic wave detector for producing a seismic trace having an amplitude corresponding to movement of the earth in response to a seismic disturbance. As mentioned above, the present invention is particularly adapted for use in marine prospecting work where the singing record phenomenon is usually encountered, but it will be understood that this invention is applicable to seismic surveying wherever the singing record phenomenon is a problem. The output signal from detector 21 is supplied through an amplifier 22 to a suitable reproducible recording device generally designated as 23. Recording device 23 may be of any suitable known type, such as a photographic or magnetic medium on which the seismic detector signals may be recorded and reproduced repeatedly and at will. Although only one seismic detector and its associated amplifying channel have been illustrated, it will be obvious to those skilled in the art that in practice a large number of such detectors are normally utilized for each seismic disturbance and that such detectors may be arranged in any suitable configuration.

Assuming that the seismic detector trace recorded on recorder 23 is of the singing record type described above, in which the signal portion, representing the energy reflected from various subsurface interfaces, is superposed on a substantially sinusoidal component, the operation of the present invention to remove this undesired component is as follows:

The trace is reproduced from recorder 23 and supplied through a so-called losser network 24 which adjusts the amplitude of the trace within predetermined limits. As mentioned above, many singing records exhibit a characteristic beat effect having a frequency which is some submultiple of the predominant frequency component of the trace, and network 24 acts as a type of automatic gain control to smooth out this beat frequency, if present. The time constant of network 24 is so chosen as not to appreciably affect the amplitude of the individual oscillations or reflections in the trace, so that these individual oscillations pass through network 24 substantially unchanged. Network 24 may be of any suitable known type for controlling the amplitude of a signal, such as a well-known diode losser which acts to maintain a voltage within predetermined amplitude limits.

The output from losser network 24 thus comprises a wave train of substantially constant amplitude, and, in a representative type of singing record, may comprise a substantially sinusoidal wave train with the reflections of interest superposed thereon and appearing therein either as variations in the amplitude or the phase of the sinusoidal wave train. As mentioned above, the time constant of losser 24 is so chosen as to pass amplitude variations in the individual cycle of the wave train without variation, thus insuring that reflections of interest superposed on the sinusoidal wave train will appear at the output of losser network 24.

The output from losser network 24 is then supplied in common to a pair of parallel branch networks. One branch of this network comprises a clipper 25 having an output connected to a filter network 26 whose output in turn is connected to an amplifier and phase inverter network 27. The output of amplifier 27 is supplied to an adder network 28. Clipper 25 acts to produce a constant amplitude square wave whose axis crossing points or frequency corresponds to the axis crossing points or frequency of the signal from losser 24. This square wave of constant amplitude from clipper 25 is supplied to filter 26, which removes the harmonics of the singing component from the square wave and produces a sine wave having a constant amplitude and a frequency determined by the frequency of the signal from losser 24. This sinusoidal wave train is supplied to network 27 where the signal is amplified and inverted in phase and then supplied to adder network 28.

The other branch of the network comprises a phase correction circuit 31 which serves to vary the phase of the signal passing therethrough in accordance with the phase changes which are introduced into the other branch signal in passing through clipper network 25. Phase correction network 31 may thus be a simple filter network having the same phase transmission characteristics as clipper 25. The output from phase correction network 31 is supplied to a filter 32 which is substantially identical to filter 26. The output from filter 32 is supplied through an amplifier 33 to another input of adder network 28. Network 28 serves to add the two signals supplied thereto, and since the signal supplied from network 27 has been inverted in phase, the predominant frequency components are thus subtracted from each other in network 28 to produce effective cancellation of the singing component. The output from adder network 28 may be supplied to a recording device 35 for producing a visual indication of the results of the operation.

It will be seen that the embodiment illustrated in FIG. 1 serves to effectively cancel a predominant component in the seismic detector trace and that such cancellation is effected even though the frequency and amplitude of this component vary during the duration of the trace. That is, clipper 25 serves to sense the frequency of the predominant component of the trace and supplies an output signal having this frequency which is then turned into a sine wave in filter network 26, inverted in phase and added to the trace itself.

The embodiment of FIG. 1 is particularly well adapted for use where the reflections of interest are superposed on the singing component as amplitude changes and may be easily detected after subtraction of the dominant frequency or frequencies of the trace. As mentioned earlier, however, the reflections of interest may sometimes appear on the detector trace only as phase changes therein without any substantial effect on the amplitude of the trace. Such phase changes are difficult to detect, particularly where the total trace is substantially a sinusoidal wave train. The embodiment illustrated in FIG. 2 may be utilized to convert these phase changes into amplitude changes prior to subtraction of the dominant frequency component. In FIG. 2, seismic detector 21 produces an output signal which is supplied through amplifier 22 to recorder/reproducer 23, as before. The output from recorder/reproducer 23 is supplied to a suitable differentiating network 36 which serves to produce an output signal proportional to the first derivative of the trace supplied thereto. Variations in the frequency of the input signal to differentiating network 36 are thus reflected as variations in the amplitude of the differentiated output signal thereof. This increases the possibility of detecting the presence of a reflection of interest in the resultant trace since, in general, a variation in amplitude is easier to detect than a variation in frequency, particularly where the wave train is nearly sinusoidal over a relatively long duration.

One output signal from differentiator 36 is supplied to clipper 25 which operates similarly to clipper 25 in FIG. 1 to produce a square output wave whose axis crossings coincide with those of the output signal from differentiator 36. The output from clipper 25 is supplied through filter 26 to the input of a losser network 37. The output from losser 37 is supplied through an amplifying and phase inverting network 27 to a phase correction network 39. In the embodiment illustrated in FIG. 2, the action of losser network 37 is controlled from a comparator network 38 which receives one input signal from differentiator 36 and receives another input signal from phase correction network 39 through which the amplified and phase inverted signal from losser network 37 is supplied. Comparator 38 acts to compare the amplitude of the output signal from differentiator 36 with the amplitude of the signal which has passed through clipper 25, filter 26, losser 37, amplifier and phase inverter 27 and phase correction network 39, and comparator 38 supplies a signal to losser network 37 to vary the amplitude of the output signal of losser 37 in accordance with variations in the amplitude of the output signal of differentiator 36.

Thus, the output from losser 37 is substantially a sine wave having a frequency determined by the frequency of the output of differentiator 36. The output from losser 37 is then amplified and inverted in phase in network 27 and passed through network 39 to remove any phase distortion introduced into the signal by elements 25, 26, 27 or 37. The output from phase correction network 39 is supplied to one input of adder 28 and the other input of adder 28 is connected to differentiator 36. Thus, the output from differentiator 36 is added to the phase-inverted signal from network 39 to result in an effective cancellation of a predetermined component of the detector trace. The resultant output signal from adder 28 may be supplied to display and recording device 35.

The embodiment illustrated in FIG. 2 has the advantage with respect to the embodiment of FIG. 1 that the one output from differentiator 36 is supplied directly to one input of adder network 28 so that no phase distortion is introduced into this signal. The embodiment of FIG. 2 has the additional advantage that the use of comparator network 38 automatically adjusts the amplitude of the auxiliary signal to the desired value and thus to a large extent eliminates the necessity for manual adjustment of this amplitude. The embodiment illustrated in FIG. 1, on the other hand, has the advantage that the output circuit from losser 24 is substantially perfectly balanced through both of the branch networks, thus reducing the possibility of asymmetrical phase distortion in the two branches.

FIG. 3 is a photo-reproduction of an oscillographic record of the operation of one embodiment of the present invention on a simulated singing record. In the tests illustrated in FIG. 3, a series of marker pulses were combined with a sinusoidal wave train to produce a simulated singing seismic record, with the marker pulses corresponding to reflections or events of interest and the sinusoidal component corresponding to the singing component. In FIG. 3, curve 50 represents the marker pulses, with separate marker pulses 50a, 50b, 50c, 50d, 50e and 50f shown. Curve 51 of FIG. 3 represents the sum of the marker pulses and a constant amplitude 50-cycle sine wave, the ratio of the amplitude of the sine wave to the amplitude of the marker pulses being five to one. It will be seen that curve 51 does not show any substantial amplitude variations along its length, thus indicating that the marker pulses to a large extent appear as phase rather than amplitude variations in curve 51, and illustrating the difficulty of visually locating relatively small reflections in a singing record. A close examination of curve 51 along the timing lines running through the marker pulses, however, will reveal slight amplitude variations in the curve at these points, particularly for marker pulses 50d and 50f.

The electrical signal represented by curve 51 was then supplied to a differentiating network which produced an output corresponding to the first derivative of curve 51. This derivative curve is shown at 52 in FIG. 3, and, as would be expected, is substantially identical to curve 51 except for a 90-degree phase shift. Examination of curve 52 along the timing lines running through the marker pulses will reveal that the differentiation operation is quite effective in converting the phase variations in curve 51 into amplitude variations in curve 52. For example, the amplitude of curve 52 at the point corresponding in time to marker pulse 50a is appreciably greater than the amplitude of the immediately adjacent portions of curve 52, whereas the amplitude of curve 51 during this time shows substantially no variation. Similarly, the portions of curve 52 corresponding to the occurrence of marker pulses 50b, 50c, and 50e exhibit substantial amplitude variations as compared with the corresponding portions of curve 51. However, visual recognition of the reflections in curve 52 would still be quite difficult.

The electrical signal represented by curve 52 was then supplied to a network substantially identical to that shown in FIG. 1, with the differentiator replacing recorder-reproducer 23 and supplying a signal corresponding to curve 52 to losser 24 and the remainder of the circuit. The circuit produced an auxiliary signal having a frequency determined by the frequency of the signal represented by curve 52, and this auxiliary signal was inverted in phase and added to the output signal from the differentiating network which had passed through the phase correction network, filter, and amplifier, substantially as described above in connection with the operation of the embodiment illustrated in FIG. 1. The resultant electrical signal from the adding network is represented in FIG. 3 by curve 53. In curve 53, a substantial part of the singing portion which was present in curves 51 and 52 has been removed, resulting in a series of portions 53a, 53b, 53c, 53d, 53e and 53f which have considerably greater amplitude than the immediately adjacent portions. The occurrences of these portions also coincide quite well in time with the occurrences of marker pulses 50a through 50f, allowing for a slight phase shift produced by the filtering circuits utilized. The improvement produced by the present invention in determining the presence of marker pulses or reflections in a singing record will be readily apparent from a comparison of curve 53 with curves 51 and 52.

Although but a few illustrative embodiments of the present invention have been described, it will be apparent to those skilled in the art that various changes and modifications may be made therein without departing from the spirit of the invention or the scope of the appended claims.

I claim:

1. Apparatus for eliminating from a seismic detector trace a singing frequency component that may vary in frequency throughout the recording thereof comprising a clipper network for producing a square wave having a substantially constant amplitude and a frequency determined by the frequency of said trace, a filter network connected to said clipper network to produce a substantially sinusoidal signal having substantially the same frequency as said square wave, a phase inverting network connected to said filter for inverting the phase of said sinusoidal signal, and an adding network for combining said inverted sinusoidal signal with said seismic detector trace to produce cancellation in said trace of said singing frequency component.

2. Apparatus for eliminating a dominant frequency component from a seismic detector trace comprising a first branch network, said first branch network comprising a clipper network for producing a square wave having a substantially constant amplitude and a frequency determined by the frequency of said trace, a filter network connected to said clipper network to produce a substantially sinusoidal signal from said square wave, a phase inverting network connected to said filter for inverting the phase of said sinusoidal signal, a second branch network connected in parallel with said first network, said second network comprising a phase correction circuit for varying the phase of said trace in accordance with phase variations introduced by said clipper network, and an adding network for combining the outputs from said first and said second branch networks to produce cancellation in said trace of the portion of said trace corresponding to said sinusoidal signal.

3. Apparatus for eliminating from a seismic detector trace an undesired frequency component that may vary in frequency throughout the recording thereof comprising means for generating a square wave signal having axis crossing points coincident with the axis crossing points of said trace, means for filtering said square wave signal to produce a substantially sinusoidal signal having a frequency substantially identical to said square wave signal and having a substantially constant amplitude, means for inverting the phase of said sinusoidal signal, and means for adding said sinusoidal signal to said seismic detector trace to produce cancellation in said trace of said undesired frequency component.

4. Apparatus for eliminating from a seismic detector trace a singing frequency component that may vary throughout the recording thereof comprising means for generating a square wave signal having axis crossing points coincident with the axis crossing points of said trace, means for filtering said square wave signal to produce a substantially sinusoidal signal having a frequency substantially identical to said square wave frequency and having a substantially constant amplitude, means for inverting the phase of said sinusoidal signal, and means for adding said sinusoidal signal to said seismic detector trace to produce cancellation in said trace of said singing frequency component.

References Cited in the file of this patent

UNITED STATES PATENTS

| | | |
|---|---|---|
| 2,184,313 | Owen | Dec. 26, 1939 |
| 2,294,627 | Parr | Sept. 1, 1942 |
| 2,304,740 | Minton | Dec. 8, 1942 |
| 2,438,217 | Johnson | Mar. 23, 1948 |
| 2,450,818 | Vermillion | Oct. 5, 1948 |
| 2,634,398 | Piety | Apr. 7, 1953 |
| 2,657,373 | Piety | Oct. 27, 1953 |
| 2,685,079 | Hoeppner | July 27, 1954 |
| 2,713,676 | Fleming | July 19, 1955 |
| 2,733,412 | Alexander | Jan. 31, 1956 |
| 2,807,797 | Shoemaker | Sept. 24, 1957 |